(12) United States Patent
Gallagher et al.

(10) Patent No.: US 6,765,611 B1
(45) Date of Patent: Jul. 20, 2004

(54) METHOD FOR COMPRESSING AN IMAGE FROM A SPARSELY SAMPLED EXTENDED DYNAMIC RANGE IMAGE SENSING DEVICE

(75) Inventors: Andrew C. Gallagher, Brockport, NY (US); Majid Rabbani, Pittsford, NY (US); Edward B. Gindele, Rochester, NY (US); Robert T. Gray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 685 days.

(21) Appl. No.: 09/718,887

(22) Filed: Nov. 21, 2000

(51) Int. Cl.[7] .......................... H04N 5/228; H04N 5/235
(52) U.S. Cl. ..................................... 348/222.1; 348/362
(58) Field of Search ............................. 348/222.1, 294, 348/241, 242, 362, 272, 273, 229.1; 250/208.1

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,667,092 A | 5/1987 | Ishihara | |
| 5,053,861 A | 10/1991 | Tsai et al. | |
| 5,065,229 A | 11/1991 | Tsai et al. | |
| 5,221,848 A | 6/1993 | Milch | |
| 5,247,366 A | * 9/1993 | Ginosar et al. | 348/242 |
| 5,416,611 A | * 5/1995 | Tandon | 250/208.1 |
| 5,652,621 A | 7/1997 | Adams, Jr. et al. | |
| 6,040,858 A | * 3/2000 | Ikeda | 348/242 |
| 6,480,226 B1 | * 11/2002 | Takahashi et al. | 348/229.1 |
| 6,646,246 B1 | * 11/2003 | Gindele et al. | 250/208.1 |
| 2002/0130957 A1 | * 9/2002 | Gallagher et al. | 348/222 |

OTHER PUBLICATIONS

U.S. Ser. No. 09/615,398 filed Jul. 13, 2000 by Gallagher et al.

* cited by examiner

Primary Examiner—Aung Moe
(74) Attorney, Agent, or Firm—Thomas H. Close (57) ABSTRACT

A method of producing a compressed image from a full resolution sparsely sampled extended dynamic range image produced by a sparsely sampled extended dynamic range image sensing device having fast photosites with a predetermined response to a light exposure for producing fast pixel values and slow photosites with a slower response to the same light exposure for producing slow pixel values, including the steps of: providing a full resolution sparsely sampled extended dynamic range image; separating the full resolution sparsely sampled image into a fast image comprising only fast pixel values and a slow image comprising only slow pixel values; and separately compressing the fast image and the slow image.

48 Claims, 10 Drawing Sheets

|   | Y 0 | 1 | 2 | 3 |
|---|---|---|---|---|
| 0 | g* | r | g* | r* |
| 1 | b* | g | b | g |
| 2 | g* | r* | g* | r |
| 3 | b | g | b* | g |

METHOD FOR COMPRESSING AN IMAGE FROM A SPARSELY SAMPLED EXTENDED DYNAMIC RANGE IMAGE SENSING DEVICE

FIELD OF THE INVENTION

The invention relates generally to the field of image capture, and more specifically to a method of compressing an image from an extended dynamic range image sensing device.

BACKGROUND OF THE INVENTION

Image sensing devices, such as a charge-coupled device (CCD), are commonly found in such products as digital cameras, scanners, and video cameras. These image sensing devices have a limited dynamic range when compared to traditional photographic film products. A typical electronic image sensing device has a dynamic range of about 7 stops. This means that the exposure for a typical scene must be determined with a fair amount of accuracy in order to avoid clipping the resultant signal By contrast, natural scenes often exhibit a dynamic range of 9 stops and higher. This is mainly a consequence of multiple light sources with widely varying intensities illuminating the scene objects. Specular highlights also contribute to the dynamic range of natural scenes.

Electronic sensors used to scan photographic film must also contend with a high dynamic range of signal intensities. In U.S. Pat. No. 5,221,848 issued Jun. 22, 1993 to Milch entitled High Dynamic Range Film Digitizer and Method of Operating the Same discloses a method and apparatus designed to extend the dynamic range of an electronic image sensor. Aimed primarily for scanning photographic film, Milch teaches a method of a one pass film scanner using a charge-coupled device scanner having a plurality of linear arrays thereon. One of the arrays is responsive to high intensities of light and the other array is responsive to low intensities of light. The information from the two arrays is then combined and digitized forming an extended dynamic range digital image. The method and apparatus disclosed by Milch is an electronic image sensor having photosites with the same spectral sensitivity but different inherent response to intensities of light which is capable of producing digital images with very high dynamic range.

Digital electronic cameras employ a single image sensor with a color filter array (CFA) to produce a sparsely sampled digital image. A typical color filter array pattern which utilizes red, green, and blue photosites for producing red, green, and blue pixel values is disclosed in U.S. Pat. No. 3,971,065, issued Jul. 20, 1976 to Bayer entitled Color Imaging Array. Interpolation algorithms are employed to produce a full resolution color image from the sparsely sampled image. Digital cameras also need to record scenes having a high dynamic range. One way to obtain a high dynamic range image from a digital camera is to employ a high bit depth analog to digital converter in the camera. Another way is to employ an image sensor having interspersed fast and slow photosites as disclosed in copending U.S. Ser. No. 09/615,398 filed Jul. 13, 2000 by Gallagher et al., which is incorporated herein by reference. Also an important feature of digital cameras is the need to produce digital images of manageable size. This is primarily due to the limited on board memory of the digital camera and due to the limitations in bandwidth for transferring the digital images to other devices.

Robert Gray and Bobby Hunt quantify an advantage associated with performing an image compression separately on the red, green, and blue pixel values of an image captured by an image sensor having a CFA in the article "Multispectral data compression using staggered detector arrays," Proc. SPIE, Volume. 432, San Diego, August 1983. However, the method of Gray and Hunt did not consider image sensors having fast pixel values derived from fast photosites with a predetermined response to a light exposure, and slow pixel values derived from slow photosites with a slower response to the same light exposure.

Commonly assigned U.S. Pat. No. 5,065,229 issued Nov. 12, 1991 and U.S. Pat. No. 5,053,861 issued Oct. 1, 1991, both issued to Tsai et al. and both entitled Compression Method and Apparatus for Single-Sensor Color Imaging Systems describe a method of compressing digital images prior to color interpolation. However, their method does not consider image sensors having fast pixel values derived from fast photosites with a predetermined response to a light exposure and slow pixel values derived from slow photosites with a slower response to the same light exposure.

Therefore, there exists a need to efficiently and effectively compress a digital image originating from an electronic image sensor having fast pixel values derived from fast photosites with a predetermined response to a light exposure and slow pixel values derived from slow photosites with a slower response to the same light exposure. Furthermore, there is a need to efficiently compress images created with an electronic image sensor having photosites with the same spectral sensitivity but different inherent response to intensities of light which is capable of producing digital images with very high dynamic range.

SUMMARY OF THE INVENTION

The need is met according to the present invention by providing a method of producing a compressed image from a full resolution sparsely sampled extended dynamic range image produced by a sparsely sampled extended dynamic range image sensing device having fast photosites with a predetermined response to a light exposure for producing fast pixel values, and slow photosites with a slower response to the same light exposure for producing slow pixel values, that includes the steps of: providing a full resolution sparsely sampled extended dynamic range image; separating the full resolution sparsely sampled image into a fast image comprising only fast pixel values and a slow image comprising only slow pixel values; and separately compressing the fast image and the slow image.

ADVANTAGES

The advantage of the present invention is that the compression technique described herein explicitly takes advantage of the unique arrangement of photosites on an imaging sensor having fast photosites with a predetermined response to a light exposure and slow pixel values derived from slow photosites with a slower response to the same light exposure in order to more efficiently compress a digital image from such a sensor.

DETAILED DESCRIPTION OF THE INVENTION

A digital image is comprised of one or more digital image channels. Each digital image channel is comprised of a two-dimensional array of pixels. Each pixel value relates to the amount of light received by an imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image for any of the above mentioned applications.

Although the present invention describes a digital image channel as a two dimensional array of pixel values arranged by rows and columns, those skilled in the art will recognize that the present invention can be applied to mosaic (non rectilinear) arrays, i.e. hexagonal arrays, with equal effect.

Imaging devices employing electronic sensors are well known, therefore the present description will be directed in particular to elements forming part of, or cooperating more directly with, apparatus in accordance with the present invention. Elements not specifically shown or described herein may be selected from those known in the art. Note that as used herein, the term image is a two dimensional array of values. An image may be a two dimensional subset of another image. The present invention can be implemented using a programmed digital computer or custom integrated digital image processing circuitry. It is well within the skill of programming art to produce such a computer program based on the disclosure provided below. The computer can be a general purpose digital computer, such as a personal computer, or a special purpose digital computer specifically designed for processing digital images. The present invention can be implemented in whole or in part within a digital camera.

Figure 1:
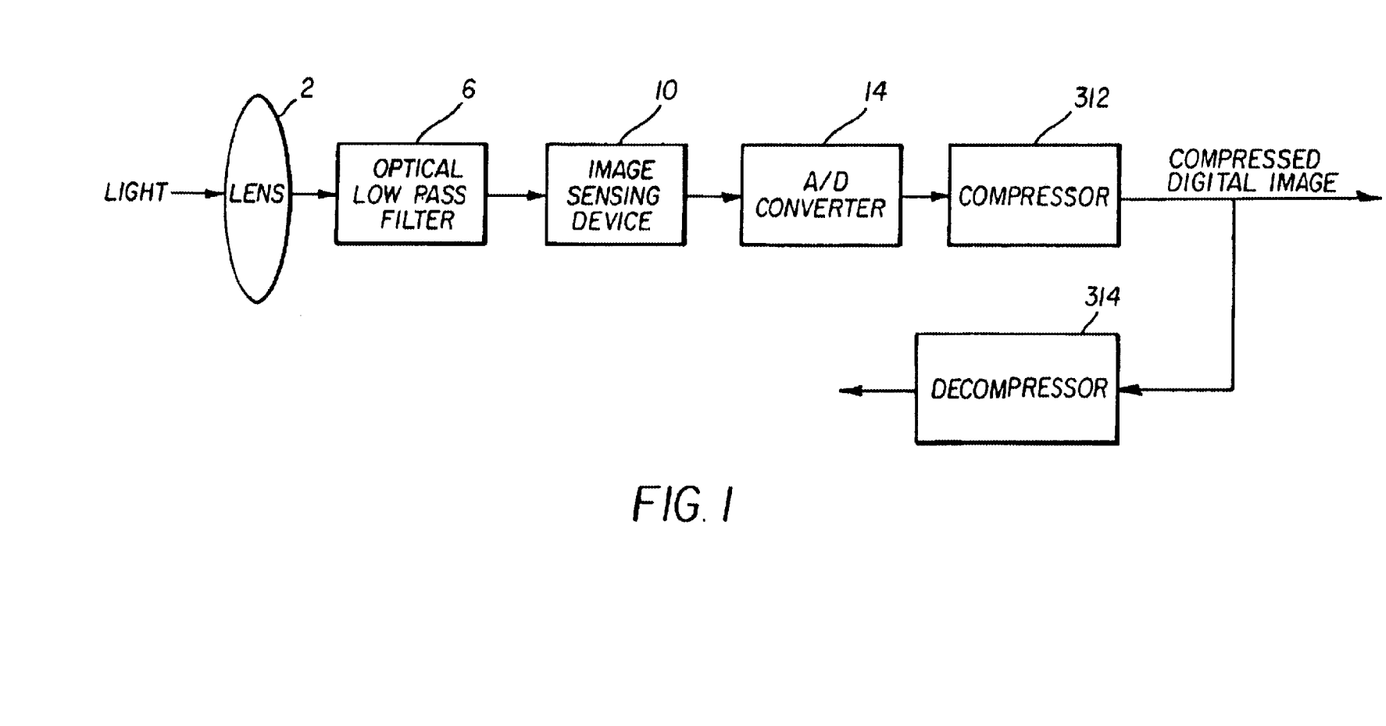
FIG. 1 is a block diagram of a digital imaging system utilizing an extended-range image sensing device and a digital image processor according to the invention.

The essential elements of the present invention are shown as a functional block diagram in FIG. 1. Light from an object or scene is incident upon a lens 2, forming a photographic image on the image sensing device 10 such as a charged-coupled device (CCD). Note that other devices, such as CMOS devices, may be used as the image sensing device 10. An optical low pass filter 6, placed between the lens 2 and the image sensing device 10 performs a slight blurring of the imaged light in order to reduce the occurrence of aliasing. An A/D converter 14 receives the voltage signal corresponding to the imaged light from the image sensing device 10 and produces a image signal corresponding to the voltage signal. The output of the A/D converter 14 is a full resolution sparsely sampled extended dynamic range image. A sparsely sampled image is defined as an image that was captured with an image sensing device having a single image sensor with multiple types of photosites. According to the present invention, the term sparsely sampled is also intended to refer to an image produced by an image sensor having interspersed fast and slow photosites, including such an image sensor having a color filter array.

The full resolution sparsely sampled extended dynamic range image is compressed according to the present invention to produce a compressed digital image by compressor 312 as described below. The compressed digital image can be stored in computer memory (not shown) or transmitted over a communication network (not shown) and later decompressed in decompressor 314 to produce a reconstructed digital image.

The A/D converter 14 shown in FIG. 1 converts the voltage signal produced by the image sensing device 10 into an image signal, i.e. a stream of digital pixel values corresponding to the voltage signal produced by the photosites of the image sensing device 10. More specifically, the A/D converter 14 converts the voltage signal, nearly linear with respect to the intensity of the incident light, from the image sensing device 10 to a discrete digital image signal, e.g. a 10 bit signal where the linear encoded values range from 0 to 1023. The A/D converter 14 may also perform processing to convert the linear code value domain image signal to a nonlinear code value domain image signal, such as an 8 bit logarithmic signal as is commonly performed in the art. For example, the following equation can be used to convert a 10 bit linear image signal a(x,y), where (x,y) specifies the row and column index of the signal location with reference to the image sensing device 10, into an 8 bit logarithmic image signal b(x,y):

$$b(x, y) = \begin{cases} 0 & 0 \le a(x, y) \le 31 \\ 73.5975 \ln a(x, y) - 255 & 32 \le a(x, y) \le 1024 \end{cases} \quad (1)$$

Note that each stop of exposure (in the linear response region of the image sensing device) results in a doubling of the linear image signal a(x,y) and results in an increase of the logarithmically encoded image signal b(x,y) by 51. In this case, the value 51 represents the number of code values per stop (cvs) of exposure.

In the preferred embodiment, the image sensing device 10 consists of an array of photosensitive elements called photosites. Each photosite is typically coated with either a red, green, or blue filter, as described by Bayer in commonly assigned U.S. Pat. No. 3,971,065, which is incorporated herein by reference. The Bayer array is a color filter array in which green filters are located in a checkerboard pattern over the photosites with red and blue filter alternating line by line to fill the interstices of the checkerboard pattern; this produces twice as many green filter sites as either red or blue filter sites. Note that the method described herein may be easily extended to color filter arrays with different arrangements of the primaries, a different number of primaries, or a different set of primaries. Thus, in the preferred embodiment, each photosite is sensitive to either red, green, or blue light. As such, the photographed image is sparsely sampled in red, green and blue. However, it is desirable to obtain a pixel value corresponding to an exposure for each of the red, green, and blue exposures at each photosite location. In this description, "red", "green", and "blue" represent the primary spectral sensitivities of an image sensing device 10, as is well known in the art of image processing.

Generally, the color pixel values other than the color value of the color filter element over the photosite are formed from the color pixel values from adjacent photosites by interpolation. While any commonly known interpolator may be used, a description of a preferred CFA interpolator is contained in the Adams et al. disclosure U.S. Pat. No. 5,652,621 issued Jul. 29, 1997 to Adams, Jr. et al. entitled Adaptive Color Plane Interpolation in Single Sensor Color Electronic Camera which is incorporated herein by reference. Adams et al. describe an apparatus for processing a digitized image signal obtained from an image sensor having color photosites aligned in rows and columns that generate at least three separate color values but only one color value for each photosite location, and a structure for interpolating color values for each photosite location so that it has three different color values. The apparatus generates an appropriate color value missing from a photosite location by the interpolation of an additional color value for such photosite locations from color values of different colors than the missing color value at nearby photosite locations. The apparatus also obtains Laplacian second-order values, gradient values and color difference bias values in at least two image directions from the pixel values corresponding to nearby photosites of the same column and row and selects a preferred orientation for the interpolation of the missing color value based upon a classifier developed from these values. Finally, the missing color pixel value from nearby multiple color pixel values is selected to agree with the preferred orientation. The arrangement of the selected photosites with respect to the image sensing device 10 will be discussed in greater detail hereinbelow. In the preferred embodiment, the responses of selected photosites are slowed, or retarded, by altering the gain of the selected photosites, herein referred to as slow photosites. Altering the gain of a photosite is commonly practiced in the art of digital camera design and manufacture.

Figure 2:
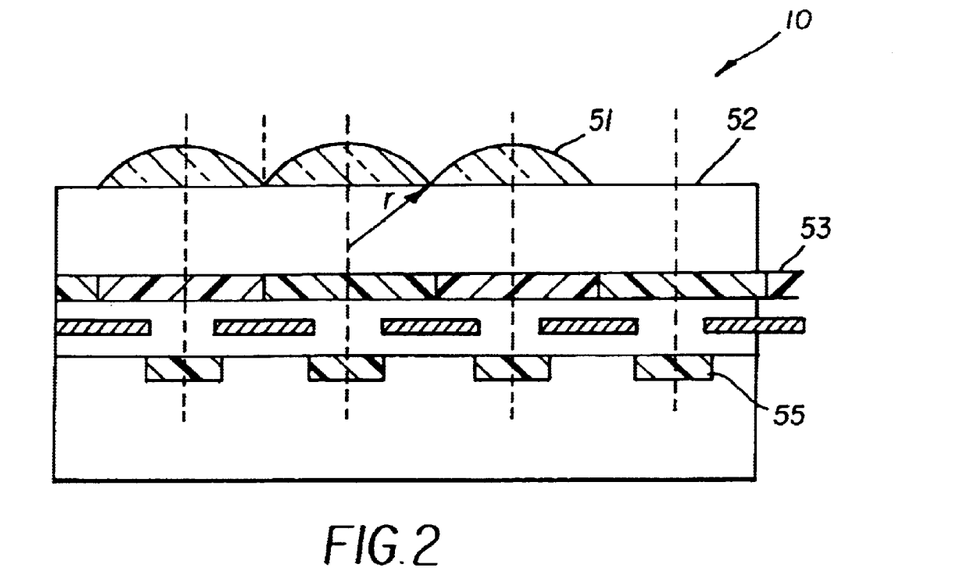
FIG. 2 is a cross-section of an interline image sensor employing an array of lenslets to alter the response of selected photosites.

With reference to FIG. 2, it is a common practice in the art of image sensor manufacture to place resin lenslets 51 on top of each photosite. For example, particularly when the image sensing device 10 is an interline solid state image sensing device, one lenslet technique is described in U.S. Pat. No. 4,667,092 issued May 19, 1987 to Ishihara entitled Solid-State Image Device with Resin Lens and Resin Contact Layer which is incorporated herein by reference. Ishihara discloses a solid-state image device which includes an image storage block having a block surface and a plurality of storage elements are embedded along the block surface to store an image in the form of electric charge. An overlying layer is deposited to form an array of optical lenses in correspondence to the storage elements. An intermediate layer is laid between the block surface and the overlying layer. Incident light focuses through the lenses and the intermediate layer onto the storage elements. The intermediate layer serves as an adjusting layer for adjusting a focal length.

FIG. 2 shows a cross section of an interline solid state image sensing device. Without the lenslets 51, the signal readout area associated with each photosensitive area 55 of a photosite makes it impossible to use the whole area of the semiconductor substrate as the photoelectric transducer area. The conventional solid-state image device does not effectively utilize all incident rays thereon and therefore has low sensitivity. The addition of a resin lenslet 51 on top of a photosite allows the incident rays of light to be focused on the photoactive areas of the photosite, thereby more effectively utilizing the incident rays of light and increasing the sensitivity of the photosite. Thus, by varying the size and/or efficiency of the lenslet 51, the sensitivity (gain) of the photosite may be easily altered. Thus, for interline devices and for CMOS sensors, the preferred method of altering the gain of the photosite is by altering the lenslet 51 placed on top of the photosite. As shown in FIG. 2, the location 52 has no lenslet, and therefore fewer incident rays of light are incident with the photosensitive area. Alternatively, a lenslet could be manufactured at location 52 with a different radius, shape, size or material as compared with the lenslet 51, thereby structured to be less efficient at focusing incident rays of light onto the photosensitive area 55 than is the lenslet 51. Those skilled in the art will recognize that if the lenslet 51 focuses 80% of the incident rays of light onto a photosensitive area 55 and the location 52 having no lenslets (or alternatively slow lenslets) allows 20% of the incident rays of light onto a photosensitive area 55, then the photosite covered by lenslet 51 is 2 stops faster than the location 52. In this case, the lenslet 51 is used for fast photosites and no lenslet is used for slow photosites, as represented by location 52.

Figure 3:
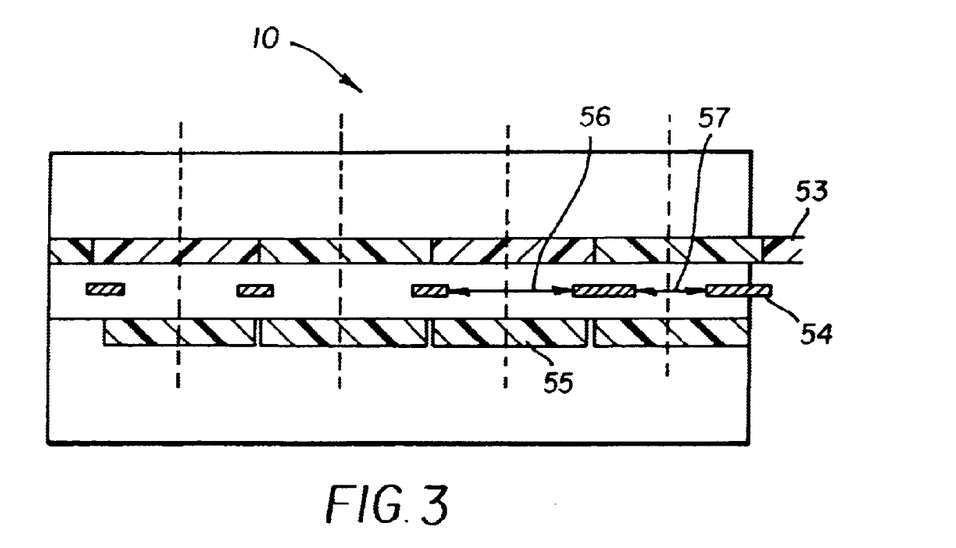
FIG. 3 is a cross-section of a full frame image sensor employing a metal mask to alter the response of selected photosites.

With reference to FIG. 3 showing a cross section of a full frame image sensing device 10, in the case where the image sensing device 10 is a full frame device, light rays incident to the photosensitive area 55 of a photosite must pass through an aperture of a light shield, typically made from metal, which is shown in cross-section in FIG. 3 to comprise light blocking mask portions 54 and large and small apertures 56 and 57 interspersed among the light blocking portions. In the preferred embodiment, the gain of photosites may be altered by modifying the light blocking mask portion 54. The sensitivity of the photosite is then directly related to the aperture of the light blocking mask portion 54. For example, one photosite with an aperture 50% of the size of a second photosite's aperture will have a response of 50% compared to that on the second photosite. For example, a large aperture 56 of a light blocking mask portion 54 allows 80% of the light rays incident upon that photosite to pass through, but a small aperture 57 allows only 20% of the incident light rays to pass. Those skilled in the art will recognize that the photosite with the large aperture 56 is 2 stops faster than a photosite with the small aperture 57. In this case, the large aperture 56 is used for fast photosites, and the small aperture 57 is used for the slow photosites. Thus, the aperture of the light blocking mask may be modified to adjust the response of the selected photosites. The Eastman Kodak Company makes full frame image sensing devices with a metal mask light shield that reduces the pixel active area of all pixels from about 80% to about 20% (for dithered scanner applications where the sensor is moved by ½ the pixel spacing horizontally and vertical and 4 pictures are taken). The invention thus involves utilizing such mask technology, but with different sized apertures, to provide an image sensor with a differential response to image light.

Figure 4:
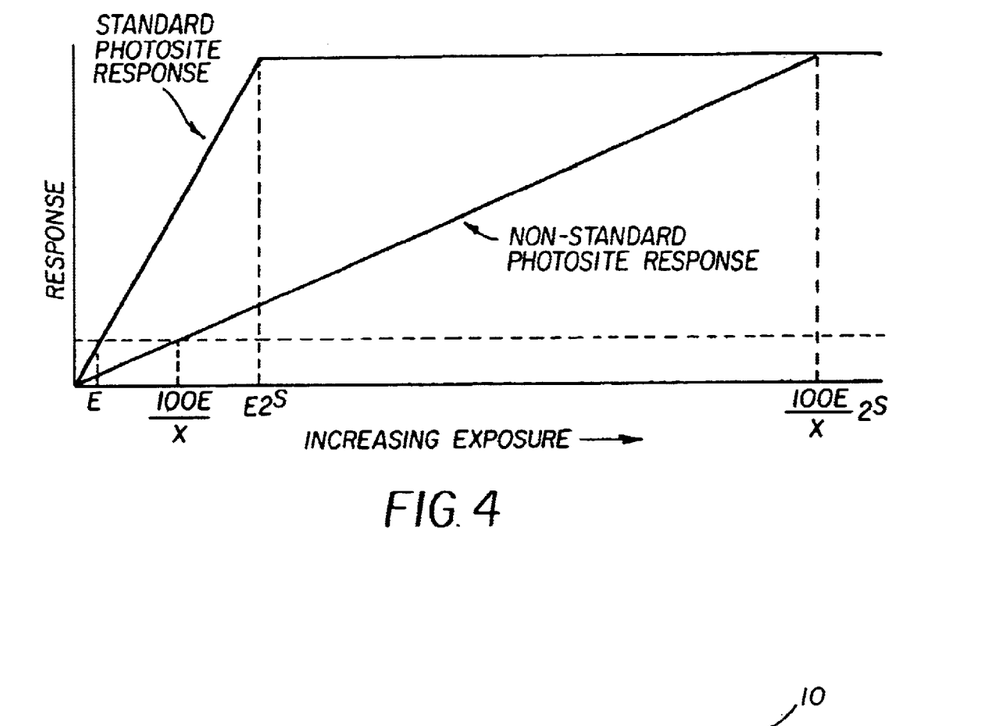
FIG. 4 is a graph illustrating the response of a fast photosite and a slow photosite.

In the preferred embodiment, the response of the selected slow photosites is X% (where X<=100) that of fast photosites for the same exposure, as shown graphically in FIG. 4. In this preferred embodiment, the selected photosites have a response that is slowed by two stops (–log X/100) relative to the fast photosites, resulting in X=25. Thus, the image sensing device 10 consists of multiple sets of photosites, fast photosites and slow photosites. The collection of the output responses of the fast photosites constitutes a fast image, i.e. a sparsely sampled version of a scene sensed with the fast photosites. Likewise, the collection of the output responses of the slow photosites constitutes a slow image, i.e. a sparsely sampled version of a scene sensed with the slow photosites.

Figure 5:
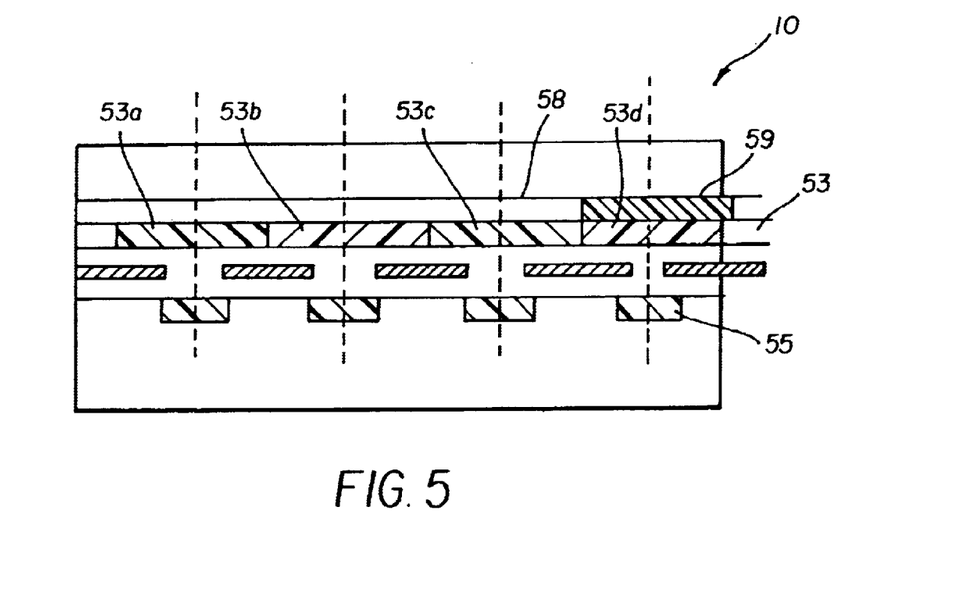
FIG. 5 is a cross-section of an image sensor employing an array of neutral density filters to alter the response of selected photosites.

As another alternative, the responses of the selected slow photosites can be slowed by the use of a neutral filter coating the photosite. FIG. 5 shows a cross section of an image sensing device with a color filter array 53. Note that the color filter array 53a is red, 53b is green, 53c is red, and 53d is green. A layer of neutral filters 58 is contained above the color filter array 53, although the position of the layer of neutral filters 58 and the color filter array 53 does not matter. Note that the layer of neutral filters 58 only contains a neutral filter at the positions of selected photosites, as indicated by the neutral filter 59. In this case, the layer of neutral filters 58 is transparent or nearly transparent for fast photosites and contains a neutral filter 59 for slow photosites. For example, if the neutral filter 59 consists of a material that allows X% transmission of light, then the response of that slow photosite will be slowed by $$-\log_2\left(\frac{X}{100}\right)$$

stops relative to the response of the fast photosite.

Figure 6A:
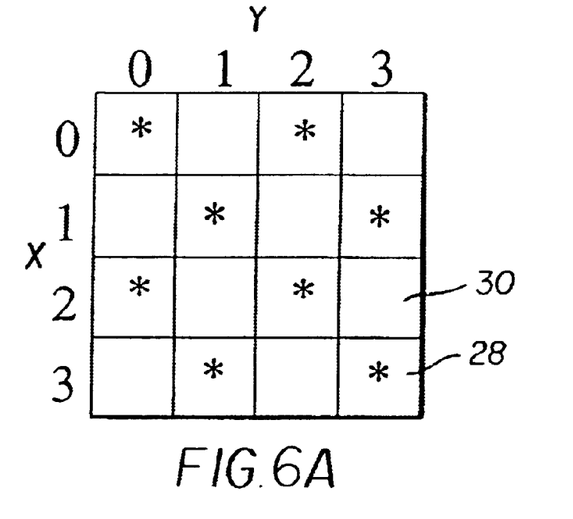
FIG. 6A illustrates the arrangement of slow photosites and fast photosites on a panchromatic image sensing device.

In the preferred embodiment, 50% of the photosites of the image sensing device 10 are selected to have slow response. Those skilled in the art will recognize that varying the percentage of photosites which have slow response will still result in the advantages of the present invention. In the case of an image sensing device 10 in which all photosites have approximately equivalent spectral sensitivity (i.e. a panchromatic image sensing device), FIG. 6A shows an arrangement of the slow photosites that will result in approximately 50% of all the photosites of the image sensing device 10 being of slow response. The photosites 28 with slow response are marked with an asterisk (*), while the photosites 30 having fast response are blank. A sparsely sampled image was previously defined as an image that was captured with an image sensing device having a color filter array. According to the present invention, the term sparsely sampled is also intended to refer to an image produced by an image sensor such as that shown in FIG. 6A where the fast and slow photosites are interspersed.

Figure 6B:
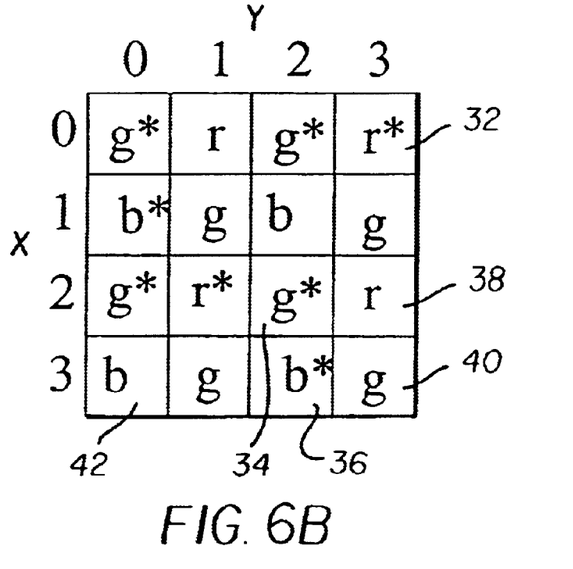
FIG. 6B illustrates the arrangement of slow photosites and fast photosites on a color image sensing device.

FIG. 6B shows an arrangement for a color image sensor wherein 50% of each photosite type (red, green, or blue sensitive) has slow response. For example, the photosites 32, 34, and 36 are red, green and blue photosites, respectively, having slow responses; the photosites 38, 40 and 42 are red, green and blue photosites, respectively, having fast responses.

Note that FIGS. 6A and 6B imply a regular pattern for the location of the slow photosites. While it is preferable that the slow photosites are arranged in a regular pattern, it is by no means necessary. The slow photosites could be arranged randomly or semi-randomly over the surface of the image sensing device 10.

Referring to FIG. 4, the response of a fast photosite to a certain exposure and the response of a slow photosite to the same exposure are shown. Note that if a level of noise n is superimposed on the response, it can easily be seen that the fast photosite will yield a valid signal with lower exposures (beginning at exposure level E) than will the slow photosite (which yields valid signal beginning at $\frac{100}{X}E$.)

Alternatively, data from the slow photosite will be valid for higher exposure levels (up to signal level of $$\frac{100}{X}E2^S,$$

where S is the inherent dynamic range of a single photosite, typically S may be about 5 stops) than would the fast photosite (which produces valid response up to an exposure of $E2^S$.) Note that both the fast photosite and the slow photosite have the same range of response in stops of exposure (S), but the response of the slow photosites is preferably $$-\log_2\left(\frac{X}{100}\right)$$

stops slower than the fast photosites, as shown in FIG. 4. It is preferred that the responses of the fast and slow photosites overlap with respect to exposure. That is, it is preferred that $$-\log_2\left(\frac{X}{100}\right) < S.$$

The overall dynamic range of the image sensing device 10, considering both fast and slow photosites, is $$S - \log_2\left(\frac{X}{100}\right).$$

In the case of the preferred embodiment, where S=5 and X=25, the overall effective dynamic range of the image sensing device 10 is 7 stops of exposure.

A full resolution extended dynamic range digital image is produced by equalizing the pixel values in the fast and slow images to account for the difference in response to the same light exposure, and performing any color interpolation that is necessary.

The full resolution sparsely sampled extended dynamic range image output from the A/D converter 14 is compressed according to the present invention in order to reduce the memory requirements or aid portability of the image. In the preferred embodiment, the image signal output from the A/D converter 14 is input to the compressor 312. The output of the compressor 312 is a compressed digital image, which may be saved in computer memory such as a computer hard drive, floppy disk, CD-ROM, or computer RAM, for example. A compressed digital image also reduces transmission times when the digital image is transmitted from one location to another over a communication network. For example, the compressed digital image may be transmitted via a communication network to a remote location, where the compressed digital image is input to the decompressor 314 for creating the reconstructed digital image. The compressed image output from the compressor 312 may be transmitted to a host computer or to a remote computer via email or the Internet for decompression. The decompressed digital image can be further processed to extend the dynamic range of the reconstructed digital image, creating a high resolution extended dynamic range image. By compressing the sparsely sampled extended dynamic range image output from the A/D converter 14, the computationally complex process of extending the dynamic range of the reconstructed digital image may be deferred until a more convenient time (e.g. on a desktop computer rather than in a camera). The compressor 312 may perform either lossy compression or lossless compression for the purpose of reducing file size. The output of the compressor 312 may be in a file format such as JPEG which is useful to most consumers.

In the case of the present invention, the photosites are of two categories, fast or slow as shown in FIG. 6A. Furthermore in the case of the color image sensor 10 as shown in FIG. 6B, within each category, the photosite may also be red, green or blue. (Those skilled in the art will recognize that many other combinations are possible.) Thus there are a total of six types of photosites. Since each type of photosite has a high correlation with neighboring photosites of the same type, the output of each type of photosite is separately compressed by the compressor 312 according to the present invention. The compressor 312 will be described in more detail hereinbelow.

Figure 7A:
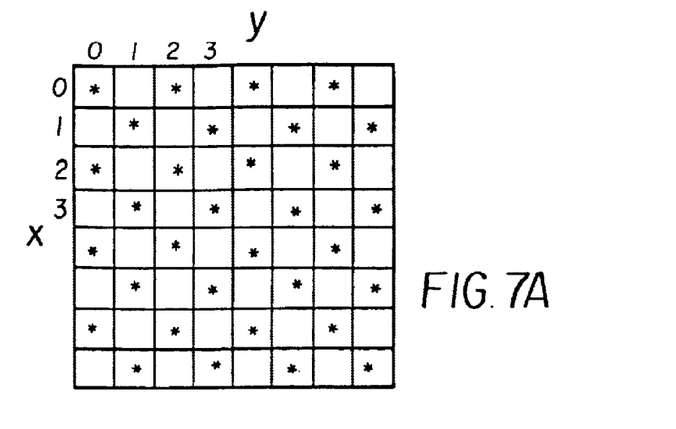
FIG. 7A illustrates the arrangement of slow photosites and fast photosites on a panchromatic image sensing device.

The compressor 312 may operate in any one of several modes. One mode is when the image sensor 10 is a monochromatic sensor such as shown in FIG. 6A. A larger portion of the image sensor 10 is shown in FIG. 7a wherein the locations containing the symbol * represent photosites having slow response, as previously described. The different modes of compressing the monochromatic sensor output are described below.

Figure 9:
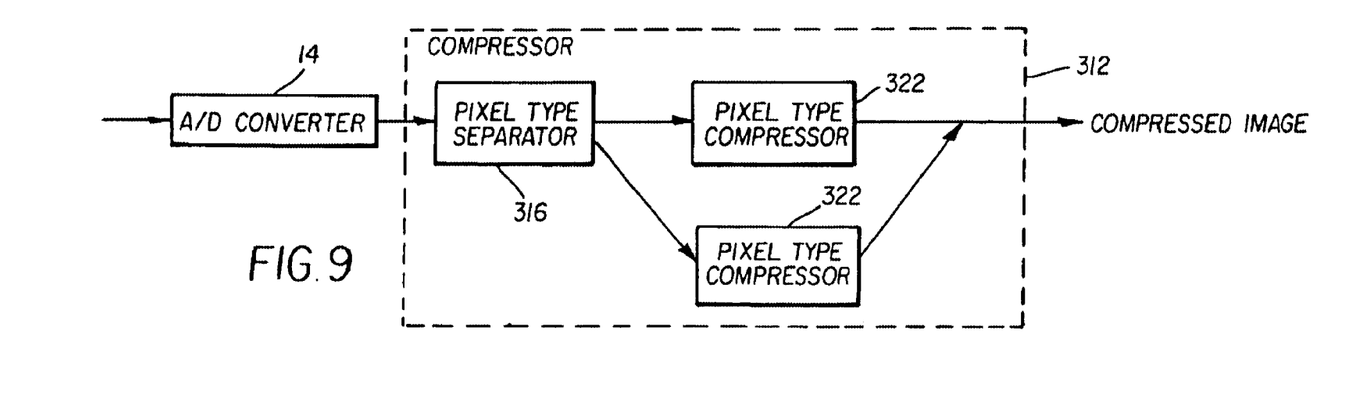
FIG. 9 is a block diagram of an alternative compressor according to the present invention.

One possible mode of operation for the compressor 312 is to compress the fast pixels independently from the slow pixels. Referring to FIG. 9, the compression of the fast pixels independently from the slow pixels is enabled by the pixel type separator 316. The purpose of the pixel type separator 316 is to allow access to each type of pixel separately. In this embodiment, the pixel type separator 316 separately outputs all the fast pixel values and all the slow pixel values. The pixels associated with a particular type of photosite as output from the pixel type separator 316 are then input to the pixel type compressor 322. The advantage of this method is that the neighboring pixel values resulting from the same type of photosite are more likely to be similar and will increase the efficiency of the compressor 312. In this mode of operation, the compressor 312 would output a compressed image consisting of fast pixels and a compressed image consisting of slow pixels. Also, if some fast pixel values are saturated or if some slow pixel values are nearly clipped (low signal) then these regions may be compressed with a higher error because the subsequent processing step of extending the dynamic range of the decompressed image will largely ignore nearly clipped pixels anyway. Thus a higher degree of compression may be achieved. These two compressed digital images may be bundled together into a single file or may be separate files. This approach has the added advantage that the compression settings for each type of photosite can be set differently. For example, since the slow pixels have a likelihood of being amplified during the subsequent processing, it might be desirable to compress them with less distortion as compared to the fast pixels.

Figure 10:
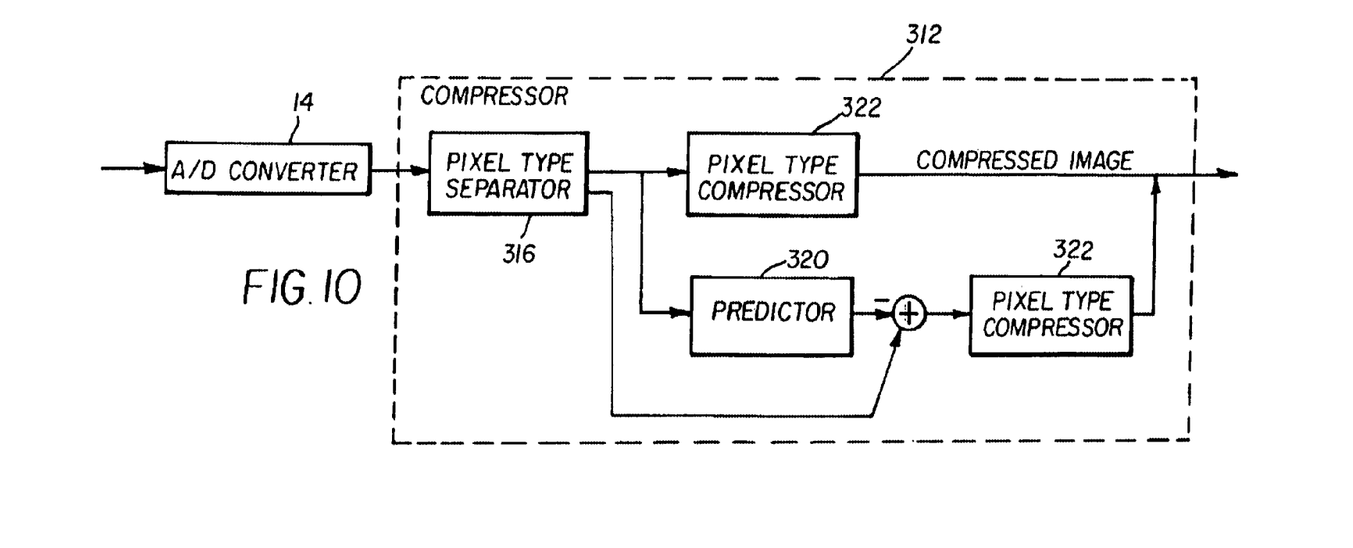
FIG. 10 is a block diagram of a further alternative compressor according to the present invention.

As an alternative embodiment referring to FIG. 10, the slow pixel values output from the pixel type separator 316 may be compressed by the pixel type compressor 322. The fast pixel values may then be compressed by first predicting the fast pixel values from the slow pixel values, and then compressing the difference between the prediction and the actual value. In this approach, prior to the compression of the fast pixel values, the slow pixel values are used to predict the value of the fast pixel values. A typical predictor 320 for a fast pixel value at location P(x,y) employs one or more of the four surrounding slow pixel values P(x+1,y+1), P(x−1, y+1), P(x+1,y−1) and P(x−1,y−1) by first applying a non-linear gain to them and then forming a linear combination of the resulting values. Next, the predictions output from the predictor 320 are subtracted from the actual values of the fast pixels output from the pixel type separator 316 to form a difference image that is subsequently compressed by another pixel type compressor 322. Once again, it is possible to compress the slow pixel values with a different compression setting (e.g., one resulting in less compression and higher image quality) than the difference image.

A limitation of the embodiment described above is that at the decompressor 314, instead of the actual values of the slow pixels, only their reconstructed values after the decompression are available. Consequently, when reconstructing the fast pixels, the decompressed difference image is added to the prediction based on the reconstructed slow pixel values instead of the original values that were used at the pixel type compressor 322. As a result, the total compression distortion in the reconstructed fast pixels will be due to the compression distortion in the reconstructed slow pixels plus the compression distortion in the decompressed difference image.

Figure 11:
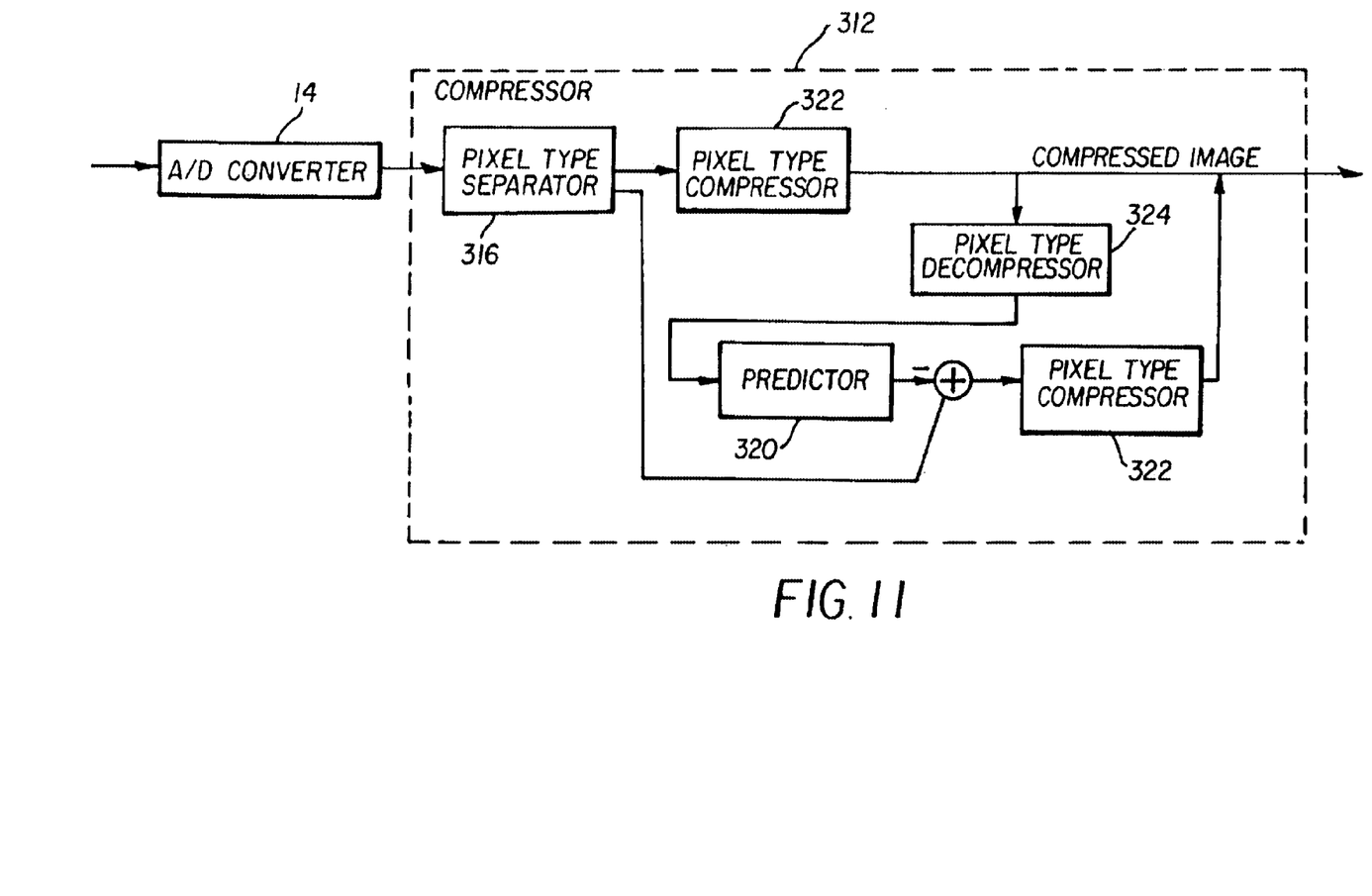
FIG. 11 is a block diagram of a still further alternative compressor according to the present invention.

This limitation is overcome according to the embodiment of the present invention shown in FIG. 11. First, as before the slow pixel values output from the pixel type separator 322 are compressed with a preferred setting of compression parameters and the compressed image is stored in image memory. Next, prior to the compression of the fast pixel values, the slow pixel values are first decompressed with a pixel type decompressor 324 and the decompressed values are used to predict the values of the fast pixels with the predictor 320 as before. Note that the operation of the pixel type decompressor 324 is to reconstruct the compressed values of a specific pixel type. Additionally, the exact operations of the pixel type decompressor 324 is based upon reversing the operations of the pixel type compressor 322. Those skilled in the art understand the relationship between a compressor and a decompressor. Next, the predictions output from the predictor 320 are subtracted from the actual values of the fast pixels to form a residual image that is compressed by another pixel type compressor 322, possibly with a different compression setting than the slow pixels.

This approach is particularly attractive when using compression hardware in the camera. Since most compression and decompression techniques (e.g., the JPEG compression standard) have a high degree of similarity, the same hardware that is used for compression can also be employed for decompression, thus saving the need for additional circuitry while improving the compression performance.

Figure 7B:
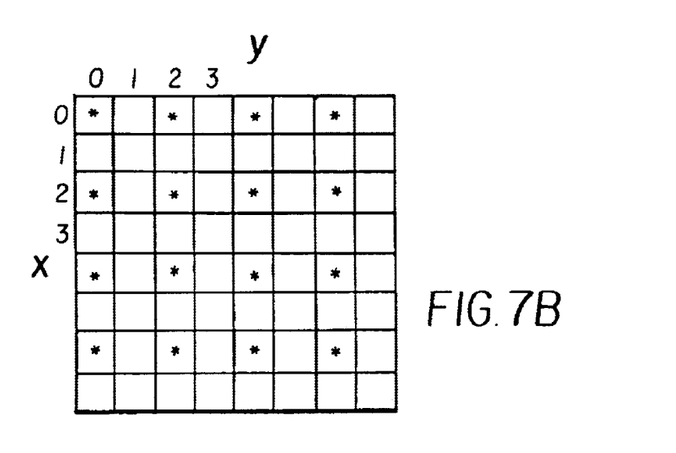
FIG. 7B illustrates the arrangement of slow even photosites.
Figure 7C:
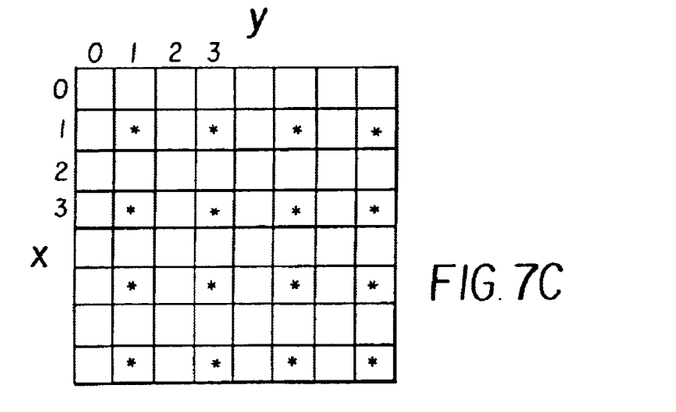
FIG. 7C illustrates the arrangement of slow odd photosites.

As can be seen in FIG. 7A, each set of the fast pixels or the slow pixels form a quincunx pattern (think of the red squares on a checkerboard). This pattern may cause difficulty for several compression algorithms if the fast pixel values are compressed separately from the slow pixel values, as previously described. For example, JPEG compression, which is commonly used in the art, relies on forming 8×8 pixel blocks. In order to apply JPEG compression to quincunx data, every other row (or column) has to be shifted left (or up). This can cause spurious vertical (or horizontal) frequencies and significantly impact the compression efficiency. FIGS. 7B and 7C illustrate a preferred method to compress pixel values located in a quincunx pattern with algorithms such as JPEG. First, the slow pixel values at even locations (locations for which the indices x and y are even), which form a rectangular pattern on the array, are compressed by JPEG compression. This separation of the slow pixel values at even locations from the slow pixel values at odd locations is accomplished by considering the slow pixel values at even locations to be one type of photosite, and the slow pixel values at odd locations to be a second type of photosite. The pixel type separator 316 will then separately address the slow pixel values at even locations from the slow pixel values at odd locations. Note that the first 8×8 pixel JPEG block will effectively span a 16×16 block on the full resolution sparsely sampled extended dynamic range image as output from A/D converter 14. Likewise, the slow pixel values at odd locations (locations for which x and y are odd) as shown in FIG. 7C may also be compressed with JPEG compression by the compressor 312. Those skilled in the art will recognize that a similar process may be performed for the fast pixel values. Thus the output of the compressor 312 for each set of slow or fast pixel values is two compressed files.

The approach of compressing the even- and odd-location slow (or fast) pixel values separately has the advantage of removing the spurious spatial frequencies that can result from the reordering of the quincunx samples. However, a disadvantage of this approach is that the spatial correlation between the even- and odd-location samples are not utilized. In a further embodiment described with regard to FIG. 10, the slow pixel values at even locations are compressed by a pixel type compressor 322 and the slow pixel values at odd locations are first predicted using a predictor 320 which inputs the slow pixel values at even locations and the resulting difference image is compressed with the pixel type compressor 322. Furthermore, since both the pixels used for prediction and the predicted pixels are of the same type, simple linear predictors can be used by the predictor 320. Some simple examples of linear predictors for a pixel at position P(x,y) include the pixel in the position one row up and to the left (P(x−1, y−1)); the average of the pixels one row up to the left and to the right (P(x−1,y−1) +P(x−1,y+1))/2; the average of the pixels one row up and one row down to the left (P(x−1,y−1)+P(x+1,y−1))/2; or the average of the four surrounding pixels (P(x−1,y−1)+P(x+1,y−1)+P(x+1,y+1)+P(x−1,y+1))/4.

A similar operation may be performed for compression of the fast pixel values. Those skilled in the art will recognize that variations from the description, such as compressing the fast pixel values and using the fast pixel values to predict the slow pixel values and generate a difference image which is compressed are obvious in light of the above description and do not significantly deviate from the scope of the present invention.

The preferred mode of operation of the compressor 312 operating on a monochromatic sensor is as follows, with reference to FIG. 11. The slow pixel values at even locations are compressed by standard compression techniques, such as JPEG with the pixel type compressor 322. Next, the decompressed (reconstructed) slow even pixel values are calculated by applying a decompression algorithm with a pixel type decompressor 324. The decompressed (reconstructed) slow even pixel values may then be used to predict the values of the slow pixel values at odd locations by the predictor 320. The residual between the slow odd pixel values and the prediction is then compressed by standard compression techniques, such as JPEG. A similar operation may be performed on the fast pixel values. Finally, the setting of the compression parameters for the slow even pixel values, slow odd difference image, fast even pixels, and fast odd difference image can be chosen differently to obtain the best image quality based on subsequent processing.

Figure 8A:
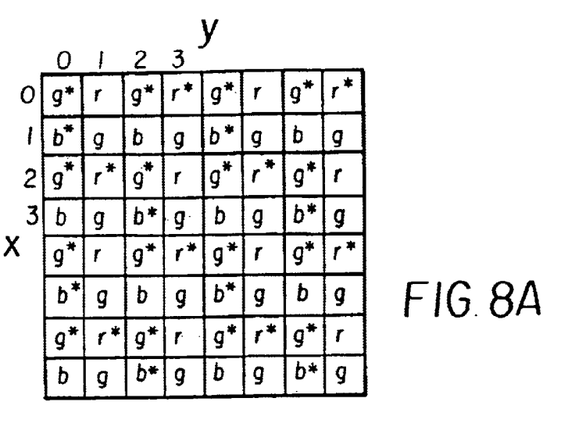
FIG. 8A illustrates the arrangement of slow photosites and fast photosites on a color image sensing device.

In the case where the image sensor 10 is a color sensor such as shown in FIG. 6B, a larger portion of the image sensor 10 is shown in FIG. 8A wherein the locations containing the symbol * represent photosites having slow response, and r g and b represent sensitivity to red green and blue light, as previously described.

One mode of operation for the compressor 312 when operating on a color image sensor as shown in FIG. 8A is described hereinbelow. Red, green, and blue sensitive photosites exist for each of the fast and slow photosites, for a total of six types of photosites in the preferred embodiment. The pixel value from a red photosite that is also a fast photosite will herein be referred to as a red fast pixel value. A similar naming convention is followed for other colors and for the values of the fast photosites. Those skilled in the art will recognize that alternative designs may be used for the placement of the filters on a color array. Additionally, the color filter array may be made up of colors other than red, green, and blue. For example, the colors may be green, yellow, cyan, and magenta. Those skilled in the art will recognize that the principles described herein for compressing an image from a sensor having fast and slow photosites on a color imaging sensor as described herein apply to any selection, number, and arrangement of colors by using methods known in the art.

A mode of operation of the compressor 312 is to compress the pixel values related to each type of photosite independently, the basic idea of which is illustrated by FIG. 9. The pixel type separator 316 separately outputs each of the six types of pixel values. The pixels associated with a particular type of photosite as output from the pixel type separator 316 are then input to the pixel type compressor 322. In this mode of operation, the compressor 312 would output a compressed image consisting of fast pixel values and a compressed image consisting of slow pixel values for each of the three colors of photosites, red, green, and blue for a total of six compressed digital images. These compressed digital images may be bundled together to form a compressed digital image in a single file or may be separate files. The advantage to this method is that neighboring pixel values resulting from the same type of photosite are more likely to be similar and will increase the performance of the compressor 312. In this mode of operation, the compressor 312 would output six compressed images. These images may be stored in a single file or in multiple files. Furthermore, the compression parameters can be set differently for each pixel type to accommodate the accuracy needed for subsequent processing and can be set differently for each color to take advantage of the spectral sensitivity of the human visual system.

As an alternative embodiment, for each color, the pixel type separator 316 separately outputs each of the two types of pixel values. The pixels associated with a particular type of photosite as output from the pixel type separator 316 are then input to the pixel type compressor 322. The pixel values associated with a first type of photosite (for instance slow pixel values) for that color may be compressed by the pixel type compressor 322 as seen in FIG. 10. The pixel values associated with the remaining type of photosite (for instance fast pixel values) may then be compressed by first predicting the pixel values associated with the remaining type of photosite (fast pixel values) from the first type of photosite (slow pixel values) using a predictor 320, creating a difference image between the actual pixel values of the remaining type of photosite (fast pixel values) and the predictions from the predictor 320, and then compressing the difference image with the pixel type compressor 322. As before, prediction involves applying a mathematical formula to the pixel values which are located in a neighborhood (on the imaging device 10) of the pixel to be predicted.

As an additional embodiment illustrated in FIG. 11, in order to minimize signal distortion, the difference image may be determined by compressing the pixel values associated with a first type of photosite with a pixel type compressor 322, decompressing with a pixel type decompressor 324 to obtain decompressed pixel values, and using these decompressed pixel values to predict the remaining type of pixel value with the predictor 320.

Figure 8B:
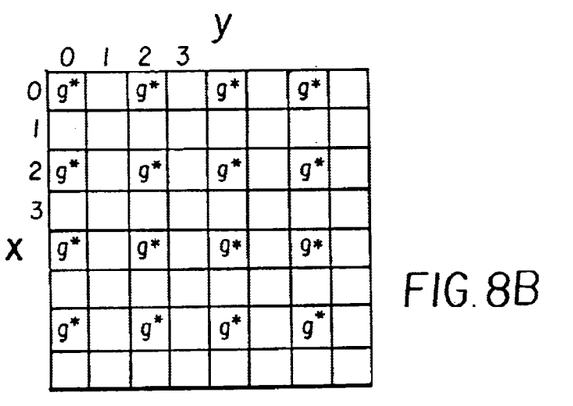
FIG. 8B illustrates the arrangement of sampled pixels corresponding to slow green photosites.
Figure 8C:
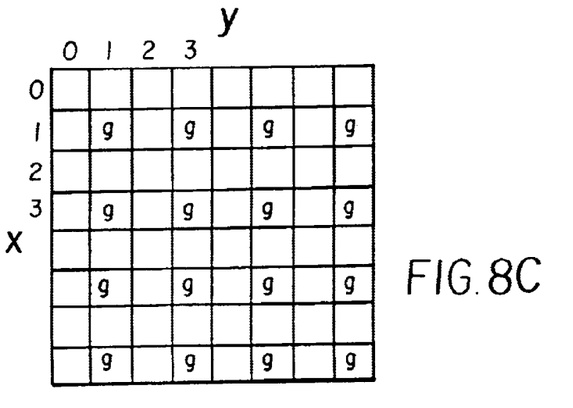
FIG. 8C illustrates the arrangement of sampled pixels corresponding to fast green photosites.
Figure 8D:
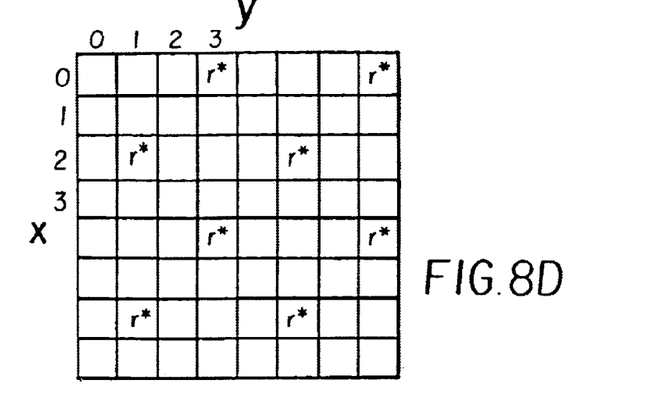
FIG. 8D illustrates the arrangement of sampled pixels corresponding to slow red photosites.

Certain compression algorithms, such as JPEG compression, operate best when the data is arranged in a regular rectangular grid as opposed to a quincunx grid. As can be seen in FIG. 8B, the slow green pixels form a rectangular grid which is ideal for JPEG compression. FIG. 8C illustrates that the fast green pixels also form a rectangular grid ideal for JPEG compression. FIG. 8D illustrates that the red slow pixels form a quincunx pattern. This pattern may cause difficulty for several compression algorithms if the fast pixel values are compressed separately from the slow pixel values, as previously described. For example, JPEG compression that is commonly used in the art relies on 8×8 pixel blocks.

One possible solution to the described dilemma is to take every other row (column) of the slow red pixel values and shift them left (up) by two pixels. This will place the slow red pixel values on a rectangular grid that is suitable for the JPEG compression. Although this approach is straightforward, it might create spurious spatial frequencies that reduce compression efficiency.

Figure 8E:
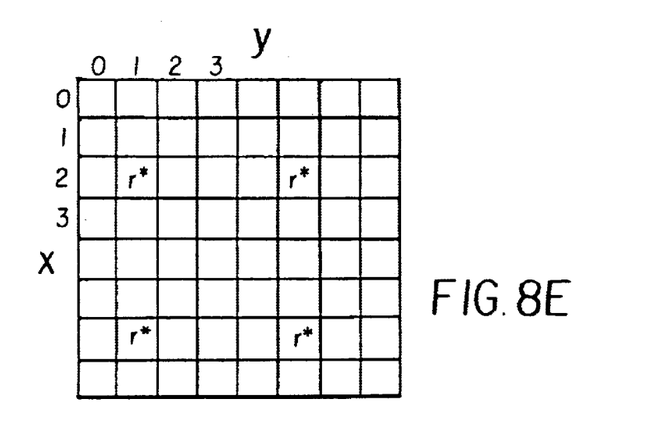
FIG. 8E illustrates the arrangement of sampled pixels corresponding to a first set of slow red photosites.
Figure 8F:
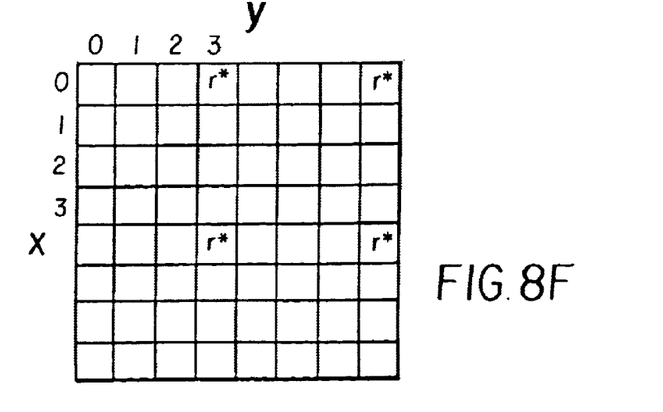
FIG. 8F illustrates the arrangement of sampled pixels corresponding to a second set of slow red photosites.

A preferred arrangement that addresses this dilemma is depicted in FIGS. 8E and 8F. The procedure is described with regard to FIG. 9. The red slow pixel values at first locations (locations of red photosites where x is 2 greater than an integer multiple of 4 and y is 1 greater than an integer multiple of 4 as shown in FIG. 8E) form a rectangular pattern on the array are considered to be an additional pixel type that the pixel type separator 316 outputs separately from other pixel types. These red slow pixel values at first locations are compressed by a block based compression routine, for instance JPEG, in the pixel type compressor 322. Note that the first 8×8 pixel JPEG block will span a 32×32 block on the full resolution sparsely sampled extended dynamic range image as output from the A/D converter 14. Likewise, the red slow pixel values at second locations (locations for which x is an integer multiple of four and y is 3 greater than an integer multiple of 4 as is shown in FIG. 8F) are also considered to be an additional pixel type that the pixel type separator 316 outputs separately from other pixel types. These red slow pixel values at second locations are compressed with a block based compression algorithm such as JPEG compression by the pixel type compressor 322. Those skilled in the art will recognize that a similar process may be performed for the blue slow pixel values, the red fast pixel values and the red slow pixel values. The output of the compressor 312 is ten compressed subimages: one subimage resulting from the slow green pixels, one from the fast green pixels, two from slow red pixels, two from fast red pixels, two from fast blue pixels and two from slow blue pixels.

Figure 12:
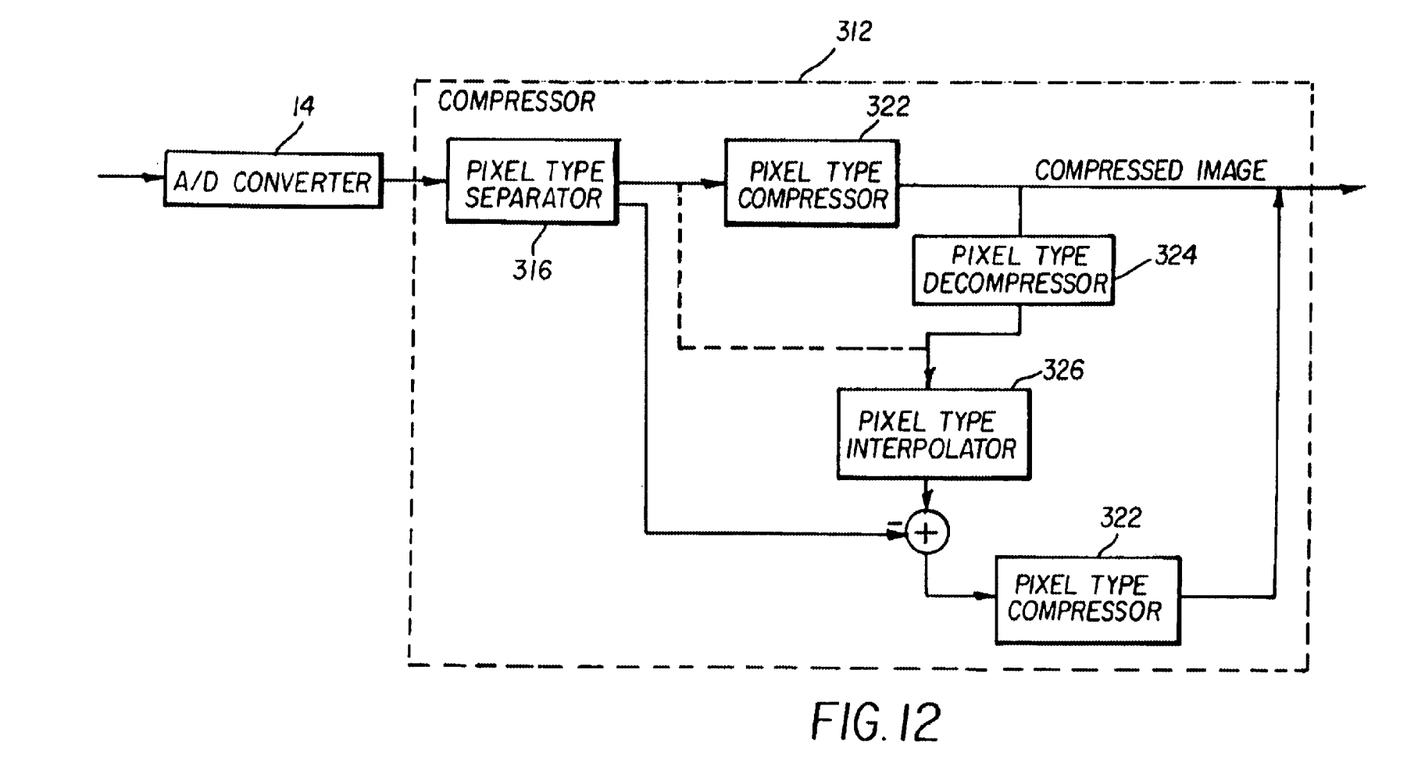
FIG. 12 is a block diagram of a preferred compressor according to the present invention.

A preferred mode of operation of the compressor 312 operating on a color sensor is based on compressing the color difference values to achieve the best image quality reconstruction is illustrated in FIG. 12 and is described as follows. First, the slow green pixel values output from the pixel type separator 316 are compressed using a predetermined compression setting (e.g., one that is determined by the pixel accuracy needed in subsequent processing) by the pixel type compressor 322. Next, the fast green pixel values output from the pixel type separator 316 are compressed with the same or a different compression setting, (e.g., with a higher degree of compression to achieve a smaller file size) by a pixel type compressor 322. Then, for each slow red pixel value output from the pixel type separator 316, the associated slow green pixel value is interpolated using the neighboring slow green pixel values by the pixel type interpolator 326. Note that the pixel type interpolator 326 may input the original pixel values of a specific pixel type as output from the pixel type separator 316, or for greater accuracy the pixel type interpolator 326 may input decompressed pixel type values created by decompressing the compressed pixel type with a pixel type decompressor 324. Next, the difference image between the slow red pixel values and the interpolated slow green pixel values is formed and the resulting difference image is compressed with a pixel type compressor 322. Similarly, at every fast red pixel location, the value of the associated fast green pixel is interpolated with the pixel type interpolator 326 using the neighboring fast green pixel values and the difference image between the fast red pixel values and the interpolated fast green pixel values is formed and compressed with the pixel type compressor 322. Finally, the same process is repeated for the slow and fast blue pixel values where the slow and fast green pixel values are interpolated using the associated slow or fast green neighbors and are subtracted from the corresponding slow or fast blue pixel values and the resulting difference images are compressed.

At this point the color image has been decomposed into six subimages that have been compressed forming six compressed digital images. Based on the CFA pattern depicted in FIG. 8A, these six subimages are: a slow green subimage that consists of ¼ of the pixels in the image; a fast green subimage that consists of ¼ of the pixels in the image; a slow red difference subimage where every pixel is the difference between a slow red value and the associated interpolated slow green based on the neighboring slow green values and that consists of ⅛ of the pixels in the image; a fast red difference subimage where every pixel value is the difference between a fast red pixel value and the associated interpolated fast green pixel value based on the neighboring fast green pixel values and that consists of ⅛ of the pixels in the image; a slow blue difference subimage where every pixel is the difference between a slow blue value and the associated interpolated slow green based on the neighboring slow green values and that consists of ⅛ of the pixels in the image; and finally a fast blue difference subimage where every pixel is the difference between a fast blue value and the associated interpolated fast green based on the neighboring fast green values and that consists of ⅛ of the pixels in the image.

This method of compressing differences between the interpolated green pixel values and the red or blue pixels values is advantageous because it is anticipated that a red, green, and blue pixel value will eventually be required at each pixel location. The pixel difference values in the difference image can be employed directly in the calculation of these additional pixel values, as described for example by commonly assigned U.S. Pat. No. 4,642,678 issued Feb. 10, 1987 to Cok entitled Signal Processing Method and Apparatus for Producing Interpolated Chrominance Values in a Sampled Color Image Signal.

Those skilled in the art will recognize that variations on this basic theme are possible based on what has herein been disclosed. For example, after compressing the first subimage consisting of slow green pixel values, either the actual value of the slow green pixel values or the decompressed (reconstructed) slow green pixel values can be used to predict the fast green pixels values. Consequently, instead of compressing the fast green pixel values, a difference image that is the difference between the fast green pixel values and their predicted values is compressed. Similarly, the interpolated slow and fast green pixel values employed in constructing the subimages 3–6 can be based on the decompressed (reconstructed) slow or fast green pixel values instead of the actual values. Finally, the slow and fast red difference subimages (subimages 3 and 4) can be compressed as a single file or two separate files. Similarly, the slow and fast blue difference subimages (subimages 5 and 6) can be compressed as a single file or two separate files.

The invention has been described in detail with particular reference to certain preferred embodiments thereof, but it will be understood that variations and modifications can be effected within the spirit and scope of the invention

PARTS LIST

| | |
|---|---|
| 2 | lens |
| 6 | optical lowpass filter |
| 10 | image sensing device |
| 14 | A/D converter |
| 28 | slow photosite |
| 30 | fast photosite |
| 32 | red slow photosite |
| 34 | green slow photosite |
| 36 | blue slow photosite |
| 38 | red fast photosite |
| 40 | green fast photosite |
| 42 | blue fast photosite |
| 51 | fast lenslet |
| 52 | location |
| 53 | color filter array |
| 54 | light blocking mask portion |
| 55 | photosensitive area |
| 56 | large aperture |
| 57 | small aperture |
| 58 | neutral density filter layer |
| 59 | slow neutral density filter |
| 312 | compressor |
| 314 | decompressor |
| 316 | pixel type separator |
| 320 | predictor |
| 322 | pixel type compressor |
| 324 | pixel type decompressor |
| 326 | pixel type interpolator |

What is claimed is:

1. A method of producing a compressed image from a full resolution sparsely sampled extended dynamic range image produced by a sparsely sampled extended dynamic range image sensing device having fast photosites with a predetermined response to a light exposure for producing fast pixel values and slow photosites with a slower response to the same light exposure for producing slow pixel values, comprising the steps of:
   a) providing a full resolution sparsely sampled extended dynamic range image;
   b) separating the full resolution sparsely sampled image into a fast image comprising only fast pixel values and a slow image comprising only slow pixel values; and
   c) separately compressing the fast image and the slow image.

2. The method claimed in claim 1, wherein the fast and slow images are compressed using JPEG compression.

3. The method claimed in claim 2, wherein the fast and slow photosites values are arranged in a checkerboard pattern, the fast and slow images are quincunx arrays of pixel values, and further comprising the step of further separating the fast and slow images into rectangular arrays of pixel values and separately compressing the rectangular arrays of pixel values.

4. A software program for performing the method of claim 3.

5. A software program for performing the method of claim 2.

6. The method claimed in claim 1, wherein the image sensing device includes a color filter array having two or more colors and further comprising the steps of further separating the fast and slow images into differently colored images and separately compressing the differently colored images.

7. The method claimed in claim 6, wherein the color filter array includes red, green, and blue color filters, and there are twice as many green filters as either red or blue filters.

8. A software program for performing the method of claim 7.

9. The method claimed in claim 6, further comprising the steps of further separating at least one of the differently colored images into rectangular arrays of pixel values and separately compressing the rectangular arrays of pixel values.

10. A software program for performing the method of claim 9.

11. The method claimed in claim 9, wherein the color filter array includes red green and blue color filters, and there are twice as many green filters as either red or blue filters.

12. A software program for performing the method of claim 11.

13. The method claimed in claim 9, further comprising the step of using the values of one of the rectangular arrays of pixel values to predict the actual values of another of the rectangular arrays of pixel values, forming a difference array representing the difference between the predicted values and the actual values, and compressing the difference array.

14. The method claimed in claim 13, further comprising the steps of compressing and decompressing the one of the rectangular arrays of pixel values and using the decompressed values of the one rectangular array to predict the values of the other rectangular array of pixel values.

15. A software program for performing the method of claim 14.

16. A software program for performing the method of claim 13.

17. The method claimed in claim 9, further comprising the step of using the values of one of the rectangular arrays to compress the values of another of the rectangular arrays.

18. A software program for performing the method of claim 17.

19. The method claimed in claim 9, further comprising the steps of compressing and decompressing the one of the rectangular arrays of pixel values and using the decompressed values of the one rectangular array to compress the values of another of the rectangular arrays.

20. A software program for performing the method of claim 19.

21. The method claimed in claim 6, further comprising the step of using the values of one of the differently colored images derived from the slow image to compress the values of another differently colored image derived from the fast image.

22. A software program for performing the method of claim 21.

23. The method claimed in claim 6, further comprising the step of using the values of one of the differently colored images derived from the fast image to compress the values of another differently colored image derived from the slow image.

24. A software program for performing the method of claim 23.

25. A software program for performing the method of claim 6.

26. The method claimed in claim 1, further comprising the steps of decompressing the compressed slow and fast images and combining the decompressed slow and fast images to form a decompressed digital image.

27. A software program for performing the method of claim 26.

28. A software program for performing the method of claim 1.

29. A digital image capture system, comprising:
   a) a sparsely sampled extended dynamic range image sensing device having fast photosites with a predetermined response to a light exposure for producing fast pixel values and slow photosites with a slower response to the same light exposure for producing slow pixel values for producing a full resolution sparsely sampled image;
   b) means for separating the full resolution sparsely sampled image into a fast image comprising only fast pixel values and a slow image comprising only slow pixel values; and
   c) means for separately compressing the fast image and the slow image.

30. The system claimed in claim 29, wherein compressing means is a JPEG compressor.

31. The system claimed in claim 30, wherein the fast and slow photosites values are arranged in a checkerboard pattern, the fast and slow images are quincunx arrays of pixel values, and further comprising the means for further separating the fast and slow images into rectangular arrays of pixel values and separately compressing the rectangular arrays of pixel values.

32. The system claimed in claim 29, wherein the image sensing device includes a color filter array having two or more colors and further comprising means for further separating the fast and slow images into differently colored images and separately compressing the differently colored images.

33. The system claimed in claim 32, wherein the color filter array includes red, green, and blue color filters, and there are twice as many green filters as either red or blue filters.

34. The system claimed in claim 32, further comprising means for further separating at least one of the differently colored images into rectangular arrays of pixel values and means for separately compressing the rectangular arrays of pixel values.

35. The system claimed in claim 34, wherein the color filter array includes red, green, and blue color filters, and there are twice as many green filters as either red or blue filters.

36. The system claimed in claim 34, further comprising means for using the values of one of the rectangular arrays of pixel values to predict the actual values of another of the rectangular arrays of pixel values; means for forming a difference array representing the difference between the predicted values and the actual values; and means for compressing the difference array.

37. The system claimed in claim 36, further comprising means for compressing and decompressing the one of the rectangular arrays of pixel values and means for using the decompressed values of the one rectangular array to predict the values of the other rectangular array of pixel values.

38. The system claimed in claim 34, further comprising means for using the values of one of the rectangular arrays to compress the values of another of the rectangular arrays.

39. The system claimed in claim 34, further comprising means for compressing and decompressing the one of the rectangular arrays of pixel values and means for using the decompressed values of the one rectangular array to compress the values of another of the rectangular arrays.

40. The system claimed in claim 32, further comprising means for using the values of one of the differently colored images derived from the slow image to compress the values of another differently colored image derived from the fast image.

41. The system claimed in claim 32, further comprising means for using the values of one of the differently colored images derived from the fast image to compress the values of another differently colored image derived from the slow image.

42. The system claimed in claim 29, further comprising means for decompressing the compressed slow and fast images and means for combining the decompressed slow and fast images to form a decompressed digital image.

43. The system claimed in claim 29 wherein the image sensor and means for compressing are in a camera.

44. The system claimed in claim 29 wherein the image sensor and means for compressing are in a film or reflection scanner.

45. The system claimed in claim 29, further comprising means for decompressing the compressed slow and fast images and means for combining the decompressed slow and fast images to form a decompressed digital image and wherein the image sensor and means for compressing are in a camera.

46. The system claimed in claim 45, wherein the means for decompressing are located remote from the camera.

47. The system claimed in claim 29, further comprising means for decompressing the compressed slow and fast images and means for combining the decompressed slow and fast images to form a decompressed digital image and wherein the image sensor and means for compressing are in a film or reflection scanner.

48. The system claimed in claim 47, wherein the means for decompressing are located remote from the film or reflection scanner.

* * * * *